(12) United States Patent
Spitzenberger et al.

(10) Patent No.: US 7,922,427 B2
(45) Date of Patent: Apr. 12, 2011

(54) TOOLHOLDER AND TOOLHOLDER ASSEMBLY WITH ELONGATED SEATING PADS

(75) Inventors: Konrad Spitzenberger, Furth (DE); Karen A. Craig, Greensburg, PA (US); Srinivas Cherla, Monroeville, PA (US)

(73) Assignee: Kennametal Inc., Latrobe, PA (US)

( * ) Notice: Subject to any disclaimer, the term of this patent is extended or adjusted under 35 U.S.C. 154(b) by 323 days.

(21) Appl. No.: 12/337,857

(22) Filed: Dec. 18, 2008

(65) Prior Publication Data
US 2010/0158620 A1 Jun. 24, 2010

(51) Int. Cl.
*B23B 27/16* (2006.01)
*B23B 27/00* (2006.01)

(52) U.S. Cl. .................. 407/104; 407/102; 407/113

(58) Field of Classification Search .................. 407/104, 407/105, 102, 103, 40, 47, 113
See application file for complete search history.

(56) References Cited

U.S. PATENT DOCUMENTS

| | | | |
|---|---|---|---|
| 3,142,110 A | 7/1964 | Hertel | |
| 3,490,117 A | 1/1970 | Hertel | |
| 3,540,102 A * | 11/1970 | Yogus et al. | 407/104 |
| 4,294,566 A | 10/1981 | Boone | |
| RE31,292 E * | 6/1983 | Erickson | 407/105 |
| 4,636,116 A | 1/1987 | Shikata | |
| 5,549,425 A * | 8/1996 | Bernadic et al. | 407/114 |
| 5,639,189 A | 6/1997 | Hoefler | |
| 5,810,518 A | 9/1998 | Wiman et al. | |
| 5,820,308 A | 10/1998 | Hoefler | |
| 5,855,457 A | 1/1999 | Arai et al. | |
| 6,050,751 A | 4/2000 | Hellstrom | |
| 6,053,672 A | 4/2000 | Satran et al. | |
| 6,742,969 B1 | 6/2004 | Hoefler | |
| 6,811,359 B2 | 11/2004 | Craig | |
| 6,929,428 B1 * | 8/2005 | Wermeister et al. | 407/113 |
| 7,063,489 B2 | 6/2006 | Satran | |
| 7,094,007 B2 | 8/2006 | Satran et al. | |
| 7,104,171 B1 * | 9/2006 | Long | 82/158 |
| 2004/0013478 A1 | 1/2004 | Dehn et al. | |
| 2005/0063792 A1 | 3/2005 | Satran | |
| 2005/0214081 A1 | 9/2005 | Satran et al. | |
| 2007/0003384 A1 | 1/2007 | Smilovici et al. | |
| 2008/0226403 A1 | 9/2008 | Craig | |
| 2008/0273931 A1 | 11/2008 | Spitzenberger | |

FOREIGN PATENT DOCUMENTS

| | | |
|---|---|---|
| DE | 1232436 | 1/1967 |
| DE | 10357811 A1 | 7/2004 |
| EP | 1380375 A1 | 1/2004 |
| EP | 1572407 B1 | 3/2007 |
| WO | 03074218 A1 | 9/2003 |

* cited by examiner

Primary Examiner — Will Fridie, Jr.

(74) Attorney, Agent, or Firm — Larry R. Meenan

(57) ABSTRACT

A toolholder has a pocket adapted to receive a double-sided on-edge cutting insert, wherein the corners of each side of the insert are radially shifted with respect to one another and has mounting pads preferably mounted about the sides of the cutting insert. The relief area for the corners of the insert is selectively fabricated to maximize the length of the support pads within the pocket of the toolholder.

25 Claims, 10 Drawing Sheets

TOOLHOLDER AND TOOLHOLDER ASSEMBLY WITH ELONGATED SEATING PADS

BACKGROUND OF THE INVENTION

1. Field of the Invention

This invention relates to toolholders for metal working operations and, more specifically, to a toolholder having a pocket with elongated seating pads for accommodating matching seating pads of a cutting insert mounted within the pocket.

2. Description of Related Art

A goal of most metal working operations is to perform a given machining task in the least amount of time and in a manner that will not result in premature tool failure. In particular, in a milling operation using on-edge cutting inserts within pockets of a milling cutter, it is necessary to securely mount these inserts within the pockets. Typically, such on-edge inserts include side surfaces which contact seating pads within the pocket for support. However, as illustrated in U.S. Pat. No. 3,490,117, which illustrates on-edge cutting inserts mounted within the pockets of a toolholder, a unique problem arises. To provide a reversible cutting insert with multiple cutting edges, for a single corner the cutting edges on one side of the insert are angularly shifted relative to those cutting edges on the other side. This creates corners with offset cutting edges and the pocket of the toolholder must be formed to provide clearance for these corners. While this provides adequate clearance for the corners of the cutting insert, this comes at the sacrifice of shortening the seating surfaces in the toolholder pocket, thereby providing less support to the cutting insert that may be available otherwise.

A design is needed for accommodating such on-edge inserts without sacrificing the length of the seating surfaces in the pocket of the toolholder.

SUMMARY OF THE INVENTION

One embodiment of the invention is directed to a toolholder for use in a metalworking operation, wherein the toolholder is adapted to hold an on-edge cutting insert with a depth and having first and second opposing segments about a central plane and with a central axis therethrough. Each segment of the insert has at least three sides and associated corners defining end cutting edges and, wherein each segment is radially offset relative to the other. The toolholder has a body extending along a longitudinal axis and having a first end and a pocket extending into the first end, wherein the pocket has at least two sides and the general shape and depth of the cutting insert intended to be held therein and, wherein the at least two sides intersect to define a pocket corner. The pocket has a primary deep relief area located within the pocket corner and associated with a segment corner of the first segment and, wherein the primary deep relief area extends substantially to the depth of the cutting insert intended to be held within the pocket. The pocket also has a primary shallow relief area located within the same pocket corner and associated with a segment corner of the second segment and, wherein the primary shallow relief area is adapted to accommodate only the segment corner of the second segment and, wherein the primary shallow relief area extends only to the depth of the second segment. Support pads extend from each of the at least two sides of the pocket defining a third segment between the first and second segments.

DESCRIPTION OF THE PREFERRED EMBODIMENTS

Figure 1:
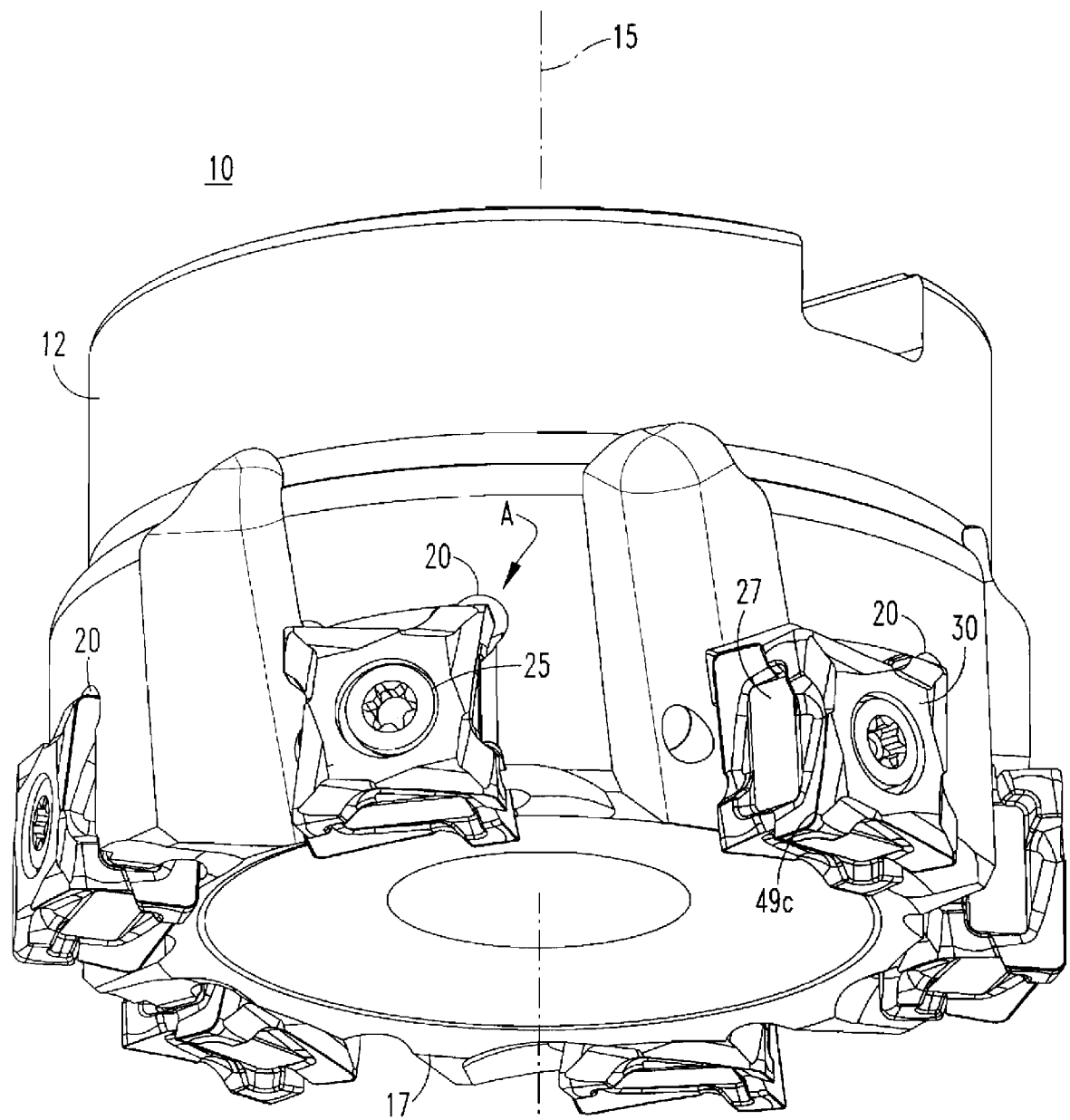
FIG. 1 is a perspective view of a toolholder in accordance with the subject invention with cutting inserts mounted therein.

FIG. 1 illustrates a toolholder 10 having a body 12 extending along a longitudinal axis 15 and having a first end 17. A plurality of pockets 20 extend about the perimeter of the toolholder body 12 and mounted within each of these pockets 20 is a cutting insert 25. The cutting insert 25 is an on-edge cutting insert, whereby the major cutting edges are located on the ends 27, as opposed to the sides 30 of the cutting insert 25. For on-edge cutting inserts, the surface area of each side is significantly greater than the surface area of any one of the ends 27.

Although some milling cutters may have different types of cutting inserts mounted within different pockets, for the purposes of discussion and as illustrated herein, all of the cutting inserts 25 are identical and the pockets 20 are identical, such that only a single cutting insert 25 and single pocket 20 will be discussed with the understanding that the others are identical.

Figure 2:
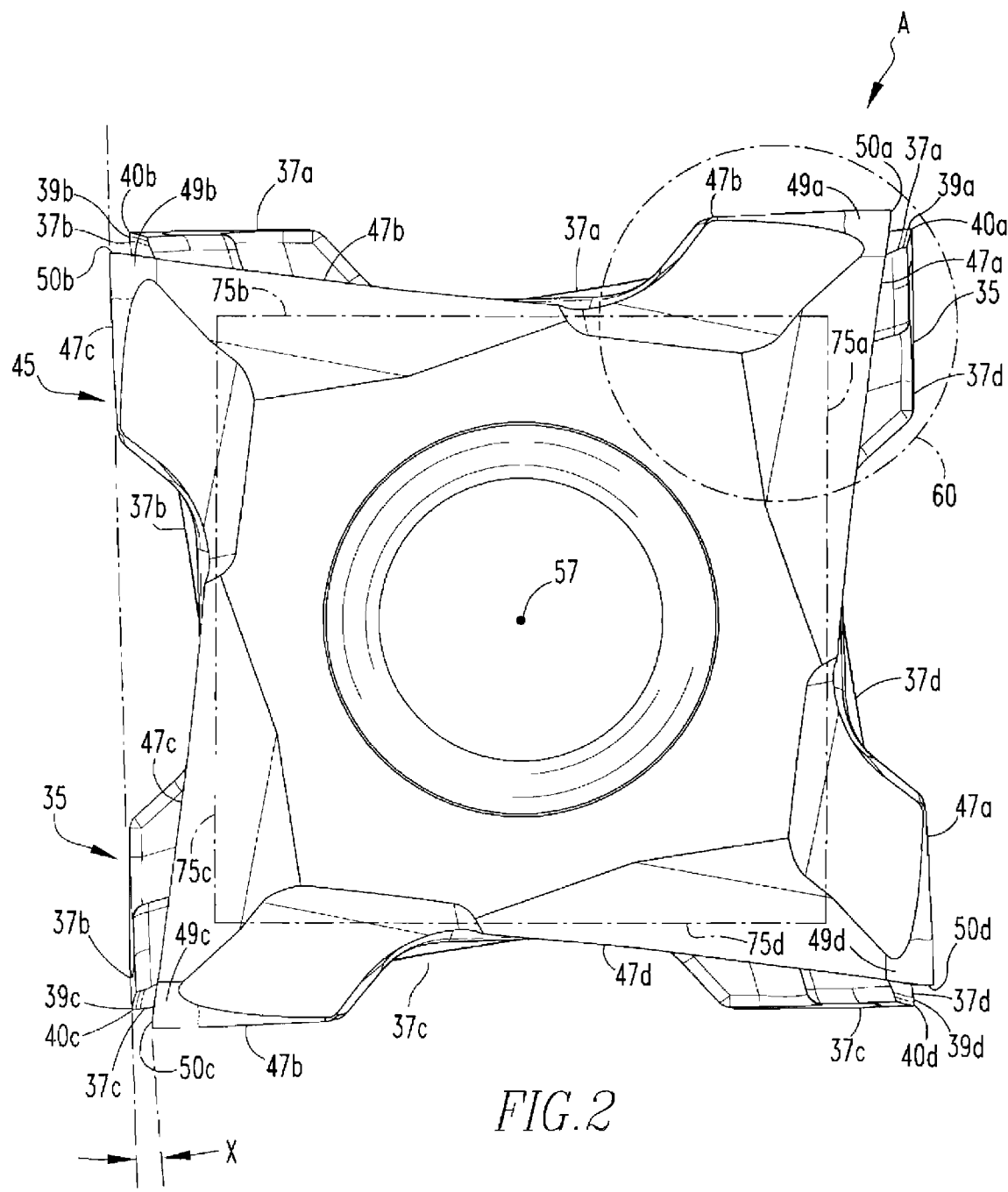
FIG. 2 is a side view of a cutting insert that may be mounted within the pocket of the toolholder.
Figure 3:
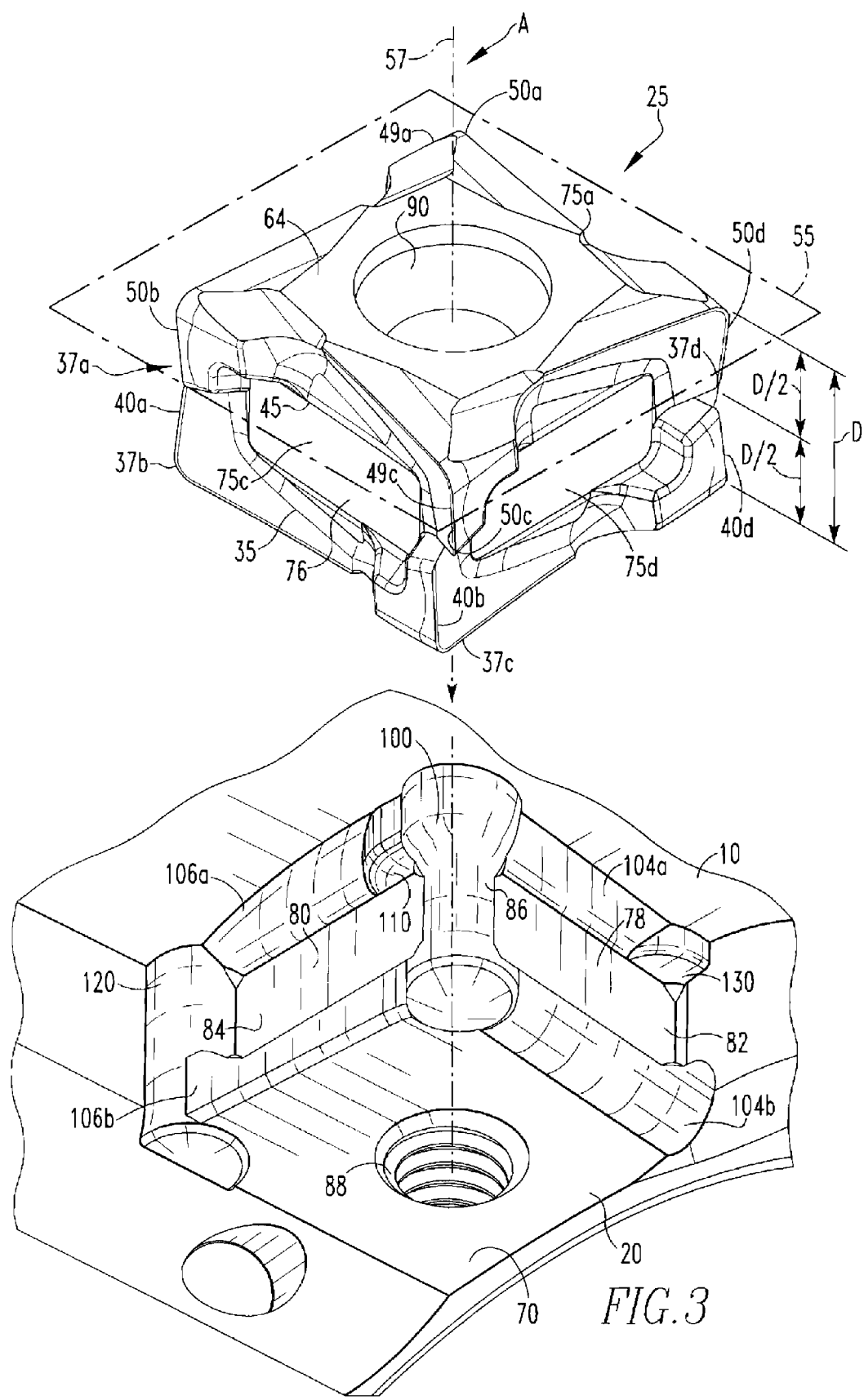
FIG. 3 is an exploded view showing the manner by which a cutting insert may be mounted within a toolholder pocket.

Directing attention to FIG. 3, a typical on-edge cutting insert 25 that may be used in the subject toolholder 10, has a depth D and has a first segment 35 and a second opposing segment 45 about a central plane 55, with a central axis 57 extending therethrough. In particular, if the insert 25 was cut in half along the central plane 55 and segment 45 was flipped and placed next to segment 35, the two segments would appear to be identical. For discussion, common corner A has been marked in FIGS. 1-3. As illustrated in FIGS. 2 and 3, the first segment 35, which may be envisioned as the lower segment, has four sides 37a, 37b, 37c, 37d (FIG. 2) and associated corners 39a, 39b, 39c, 39d defining end cutting edges 40a, 40b, 40c, 40d. For assistance in identifying these surfaces, the reference numbers for each side have been used in two locations. Correspondingly, the second segment 45, which may be envisioned as the upper segment, has four sides 47a, 47b, 47c, 47d and associated corners 49a, 49b, 49c, 49d defining end cutting edges 50a, 50b, 50c, 50d.

As can be seen in FIG. 2, the first segment 35 is radially offset about the central axis 57 relative to the second segment 45 by an angle X. X may be in the range of 1 to 4 degrees and, as illustrated herein, is approximately 2.5 degrees.

Figure 2B:
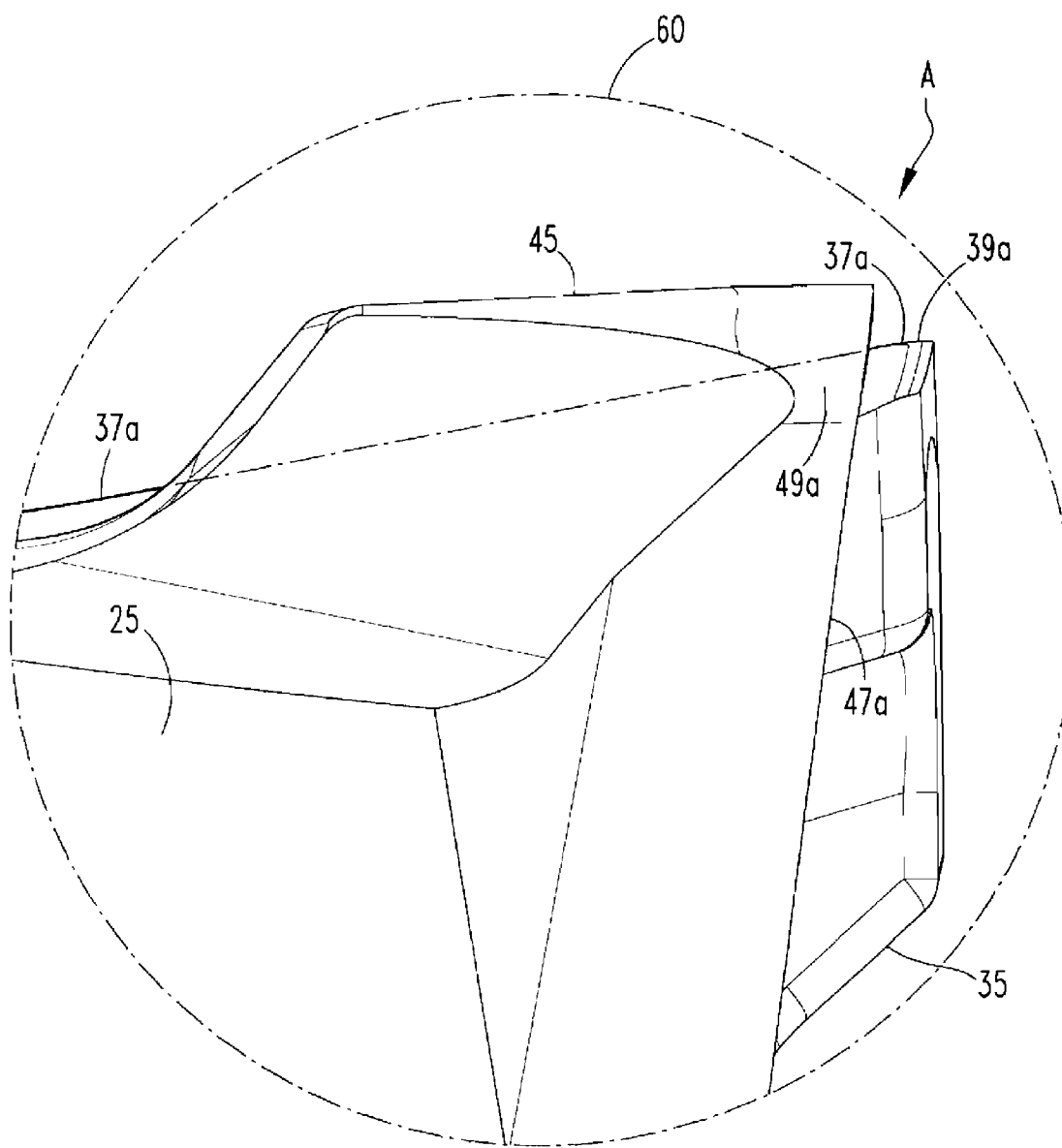
FIG. 2B is an enlargement of the area encircled in FIG. 2 labeled 60.

Directing attention to the encircled area identified as 60 and enlarged in FIG. 2B, a key feature of the subject invention is the manner by which the toolholder accommodates the corner 39a of the first segment 35 and the corner 49a of the second segment 45, which are offset from one another.

As illustrated in FIG. 3, the first segment 35 of the cutting insert 25 has a depth D/2 which is half the overall depth D. The second segment 45 also has a depth D/2 which is half the overall depth D.

The insert 25 is supported within the pocket 20 at three locations. This first surface is a flat surface, identical to flat surface 64, but on the opposite side of the insert, which rests against the floor 70 of the pocket 20. Additionally, there are four mounting surfaces 75a, 75b, 75c, 75d on the cutting insert 25 suitable for mounting against support pads 78, 80 extending from the first side 82 and the second side 84 of the pocket 20 to provide the other two surfaces. The support pad 80 may also be referred to as the axial support pad because it supports loads along the longitudinal axis 15 of the milling cutter 10. Additionally, support pad 78 may be referred to as the tangential support pad because it supports loads tangential to the longitudinal axis 15. The mounting surfaces 75a, 75b, 75c, 75d of the cutting insert 25 define a third segment 76 situated between the first segment 35 and the second segment 45.

The pocket 70 has the general shape and depth of the cutting insert 25 intended to be held therein and the two sides 78, 80 intersect to define a pocket corner 86. As discussed, the support surfaces in the pocket 20 for the insert 25 are the pocket floor 70, the support pad 78, and the support pad 80. The majority of the force produced during a machining operation when the toolholder is a milling cutter illustrated in FIG. 1 is transmitted through the corner 49c to the support pad 78 and secondary forces are transmitted to the support pad 80.

It should be noted that there is a threaded bore 88 (FIG. 3) within the floor 70 of the pocket 20 to accept a retaining insert screw (not shown) which passes through the central bore 90 of the insert 25. In general, the insert screw is intended to locate the insert 25 within the pocket 20 and is not intended to absorb significant forces caused by the metalworking operation. As a result, the large majority of the forces produced during the cutting operation are applied to the support pads 78, 80 and, it is very important that each of these support pads 78, 80 contact the associated mounting surface 75a, 75b on the insert 25 with as much surface area as possible. Worded differently, it is important for the two support pads 78, 80 to be as long as possible, while at the same time providing the necessary clearance to the insert corners, such as corners 39a and 49a, of the cutting insert 35.

Directing attention to FIG. 3, in order for the cutting insert 25 to be mounted within the pocket and for the support pad 78 and support pad 80 to engage the appropriate mounting surface 75a, 75b of the cutting insert 25, it is necessary for the pocket 20 to include relief areas for the corners (50a shown) of the cutting insert 25. One corner 86 has already been identified. FIG. 2B illustrates the portion of the cutting insert 25 that will rest within the corner 86 of the pocket 20.

Figure 6:
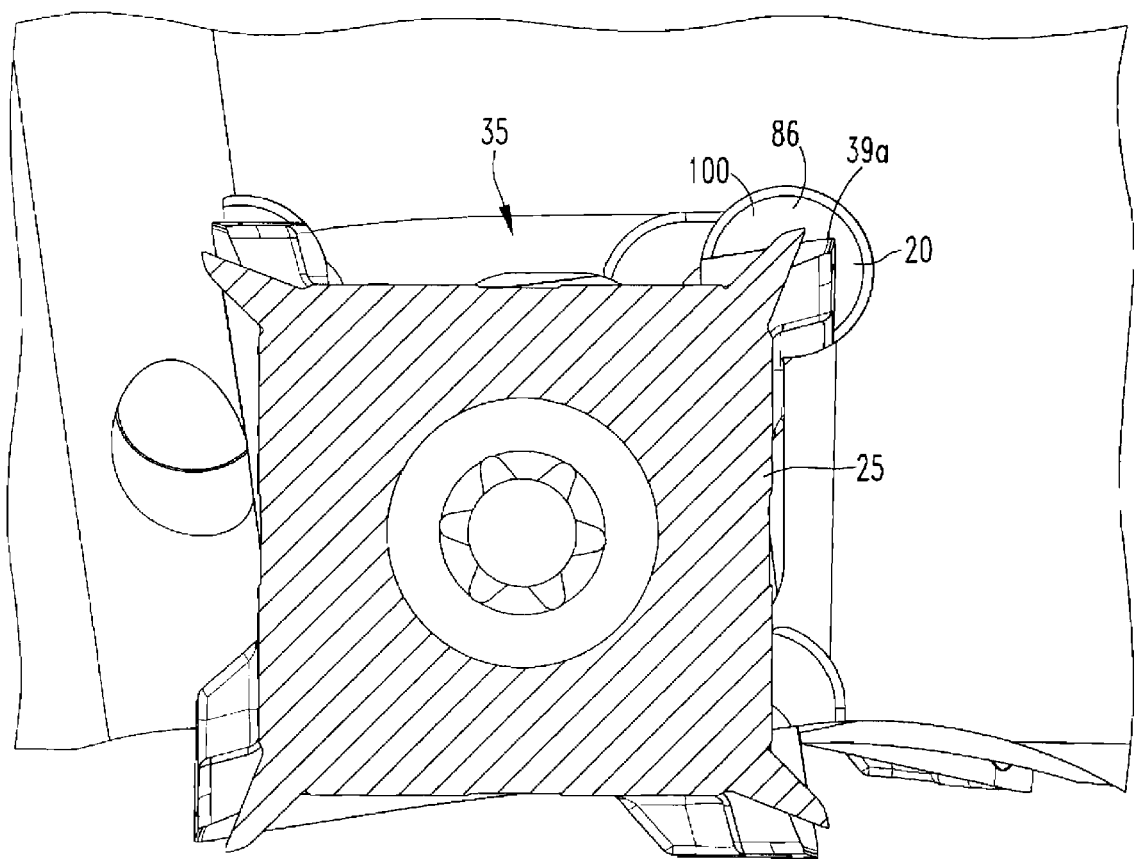
FIG. 6 is a view similar to that illustrated in FIG. 4, but with a cross-sectional portion of a cutting insert mounted within the pocket to illustrate clearances on the lower half of the insert.
Figure 7:
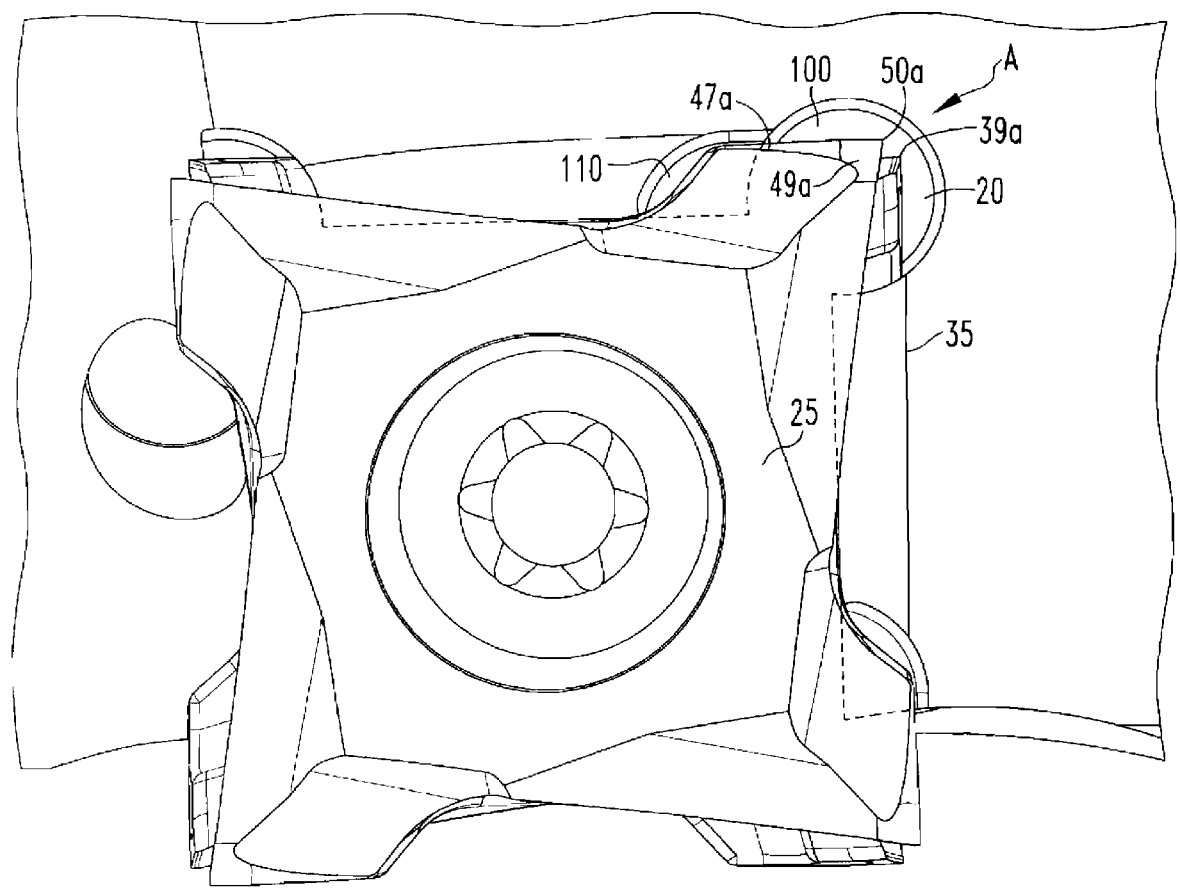
FIG. 7 is a view similar to FIG. 4, however, now including a full insert within the pocket again illustrating the clearances around the corners of the cutting inserts.

Because the corner 39a of the first segment 35 resides only in the lower half of the cutting insert, and corner 49a of the second segment 45 resides only in the upper half of the cutting insert 25, as illustrated in FIG. 3, then the corner 86 of the toolholder 20 may be sculpted to conform to this unique corner profile of the insert with minimum impact to the length of the support pad 80. In particular, a primary deep relief area 100 is located within the pocket corner 86 and is associated with the segment corner 39a (FIG. 2B) of the first segment 35 and extends substantially to the depth D of the cutting insert 25. This is also illustrated in FIG. 6. Significantly, rather than enlarging the primary deep relief area 100 to accommodate the corner 49a (FIG. 2B) of segment 45, a primary shallow relief area 110 is located within the same pocket corner 86 and is associated with corner 49a. This is also illustrated in FIG. 7. This primary shallow relief area 110 is sculpted to accommodate only the corner 49a of the second segment 45 and extends only to the depth of corner 49a, which, as illustrated in FIG. 3, is one-half the depth of the entire insert 25.

In such a fashion, the length of the second support pad 80 is maximized, while at the same time, the relief area 110 is provided for the corner 49a. It should be appreciated that the depth of the primary shallow relief area 110 extends only to the support pad 80 to maximize the length of the support pad 80. Without such an accommodation, the primary shallow relief area 110 would extend the entire depth of the pocket 20 and remove the portion of the support pad directly below the primary shallow relief area 110.

As a result, the corner 86 has a dual relief area that has a primary deep relief area 100 extending substantially the entire depth of the insert 25 and a primary shallow relief area 110, adjacent to the primary deep relief area 100 that extends to a partial dept of the insert 25.

Directing attention to FIG. 3, each support pad 78, 80 extends along the length and protrudes from its respective side 82, 84 of the pocket 20 to define recesses 104a, 104b, 106a, 106b adjacent to the pads 78, 80 to provide additional clearance to the cutting insert 25.

Figure 4:
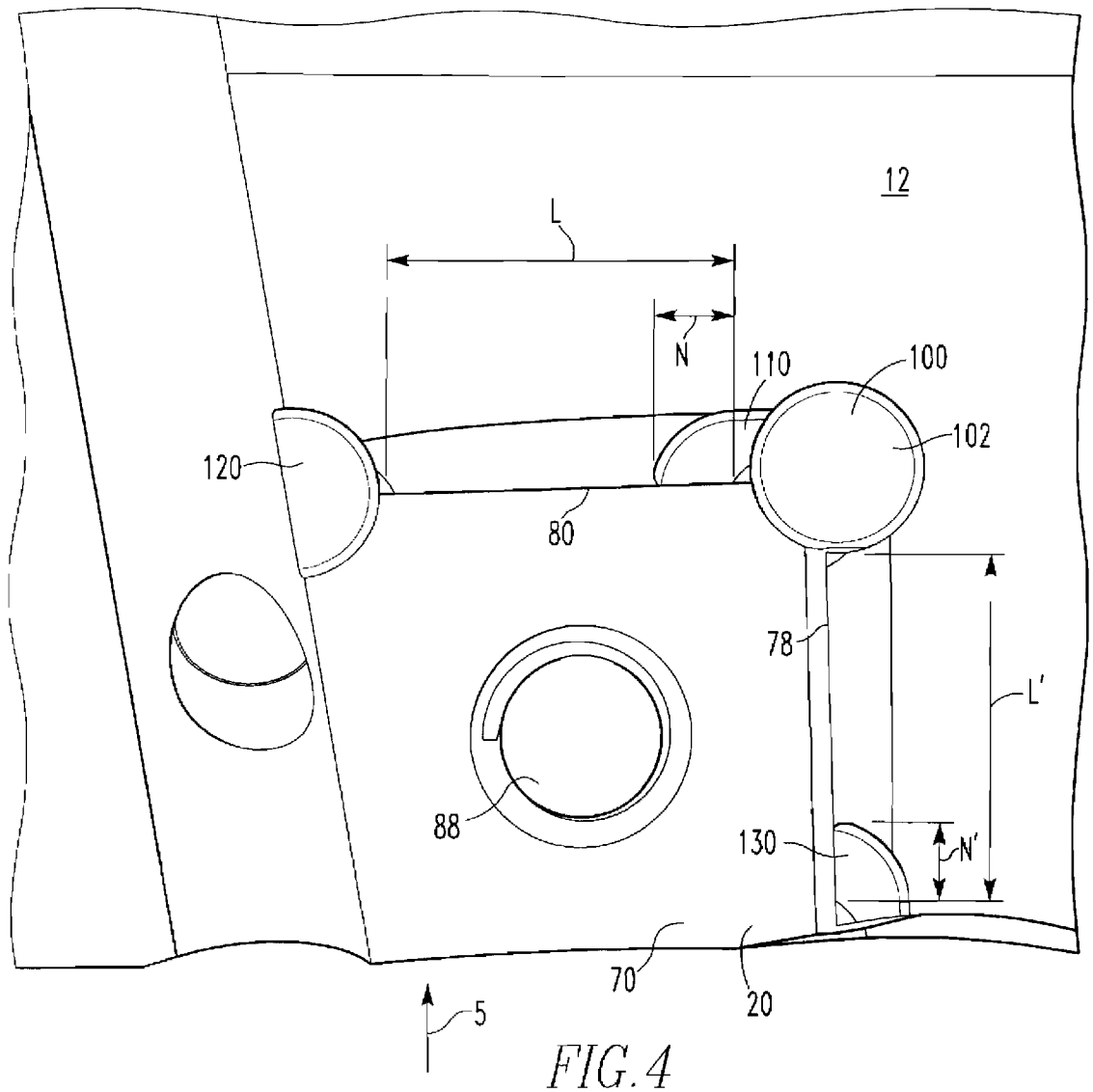
FIG. 4 is a portion of the toolholder illustrating the toolholder pocket viewed along an axis perpendicular to the pocket floor.

Directing attention to FIG. 4, the primary shallow relief area 110 overlaps the support pad 80 by a distance N, which is approximately 10 to 20 percent of the length L of the support pad 80. In a preferred embodiment, the primary shallow relief area 110 overlaps the support pad 80 over approximately 15 percent of the length L of the support pad 80.

As illustrated in FIG. 4, the length L of the support pad 80 extends beyond the primary shallow relief area 110 to the primary deep relief area 100. The primary deep relief area 100 is a generally cylindrical bore 102 extending into the body 12 of the toolholder 10 and may be simply manufactured utilizing a drill. On the other hand, the primary shallow relief area 110 has an extended shape and may be manufactured using an end mill.

Briefly returning to FIG. 2, the first segment 35 and the second segment 45 are angularly offset with respect to one another but, furthermore, are angularly offset with respect to the third segment 76 as measured from an associated mounting surface 75c by an angle X/2.

As illustrated herein, the pocket 20 has two walls 78, 80 to accommodate a cutting insert 25 having four walls. It should be appreciated that the subject invention is not limited to a cutting insert having four sides but may also accommodate, with appropriate modifications, inserts having at least three sides.

While what has so far been discussed is accommodating within the pocket 20 corner 37a of first segment 35 and corner 49a of second segment 45, the subject toolholder design may also accommodate two additional pairs of insert corners. In particular and focusing upon FIGS. 3 and 4, a secondary deep relief area 120 extends within the pocket 20 adjacent to the support pad 80 opposite the pocket corner 86. The secondary deep relief area 120 extends substantially the entire depth D of the cutting insert 25 intended to be held within the pocket 20.

Additionally, a secondary shallow relief area 130 extends within the toolholder 10 adjacent to the support pad 78 opposite the pocket corner 86. The secondary shallow relief area 130 extends only to the depth D/2 of the second segment 45.

The secondary shallow relief area 130 overlaps the support pad 78 a distance N', which is approximately 10 to 20 percent of the length L' of the support pad 78. Preferably, the secondary shallow relief area 130 overlaps by approximately 15 percent.

Figure 5:
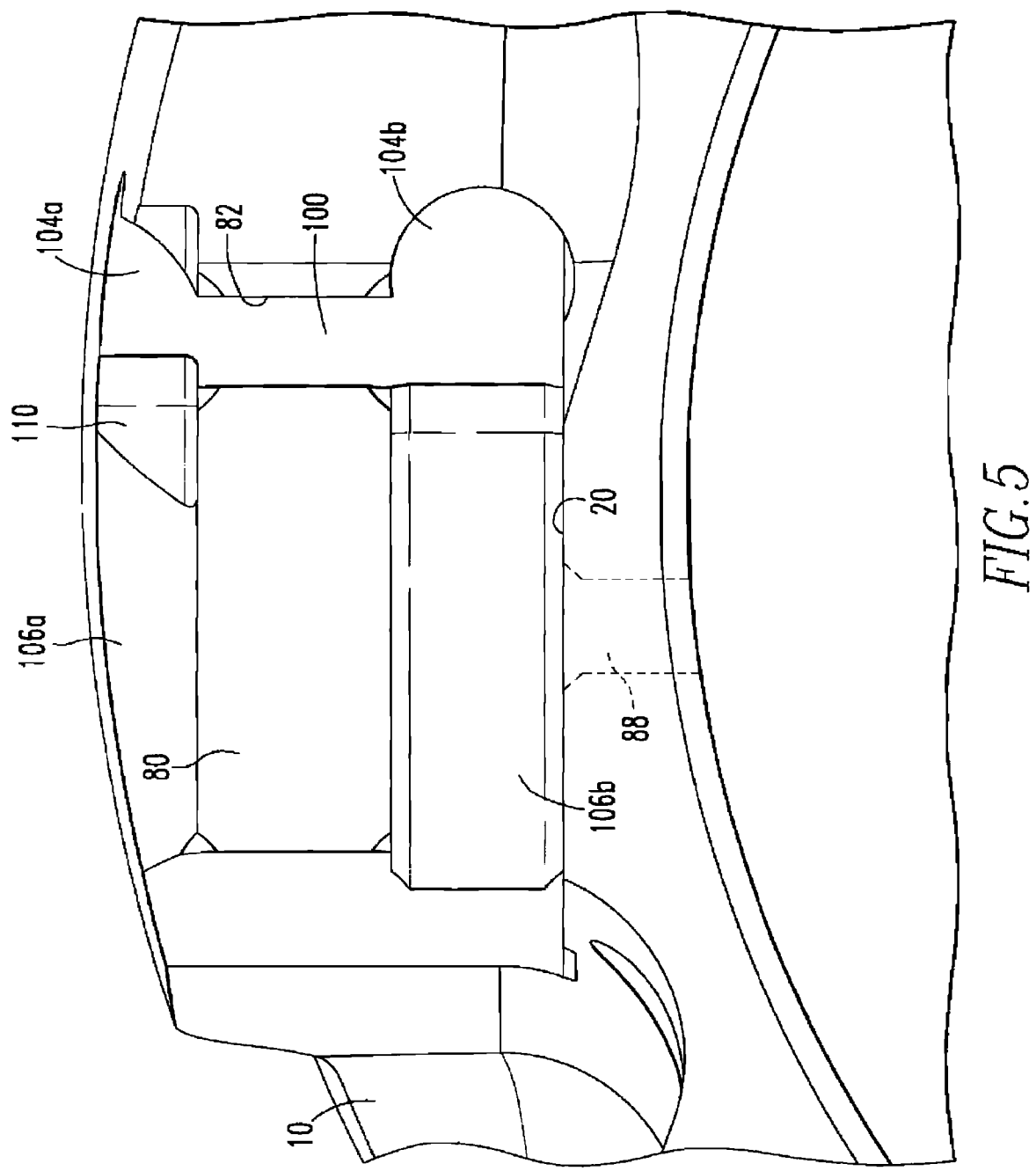
FIG. 5 is a view of the toolholder pocket when viewed along line 5 in FIG. 4.

FIG. 5 is an end view of a portion of the milling cutter 10 looking upwardly into a pocket 20 from the first end 17, illustrated in FIG. 1. Support pad 80 is illustrated as generally perpendicular to support pad 82 and the pocket floor 20 has the threaded bore 88 extending therethrough. Recess 104a and recess 104b along with recesses 106a and 106b are visible. The depth of the primary deep relief area 100 with respect to the depth of the primary shallow relief area 110 may be better appreciated from this view.

FIG. 6 illustrates a view similar to that of FIG. 4 but with the cutting insert 25 mounted within the pocket 20. FIG. 6 also illustrates a cross section of the cutting insert 25 along plane 55 shown in FIG. 3. As a result, only the first segment 35 of cutting insert 25 is illustrated. Of particular interest, corner 39a of segment 35 of the cutting insert 25 is provided adequate clearance by the primary deep relief area 100.

Directing attention to FIG. 7, the entire cutting insert 25 is illustrated within the pocket 20 and it becomes apparent that the corner 49a of side 47a could not be accommodated by the primary deep relief area 100 only and additional relief area is required. It is for this reason the primary shallow relief area 110 exists and, furthermore, that the depth of the primary shallow relief area 110 extends down to the side of the support pad 80, as illustrated in FIG. 3.

The toolholder 10 has been discussed with respect to a milling cutter, however, it should be appreciated that the design discussed herein may be easily adapted to the pocket of a stationary toolholder used for turning applications.

Figure 8:
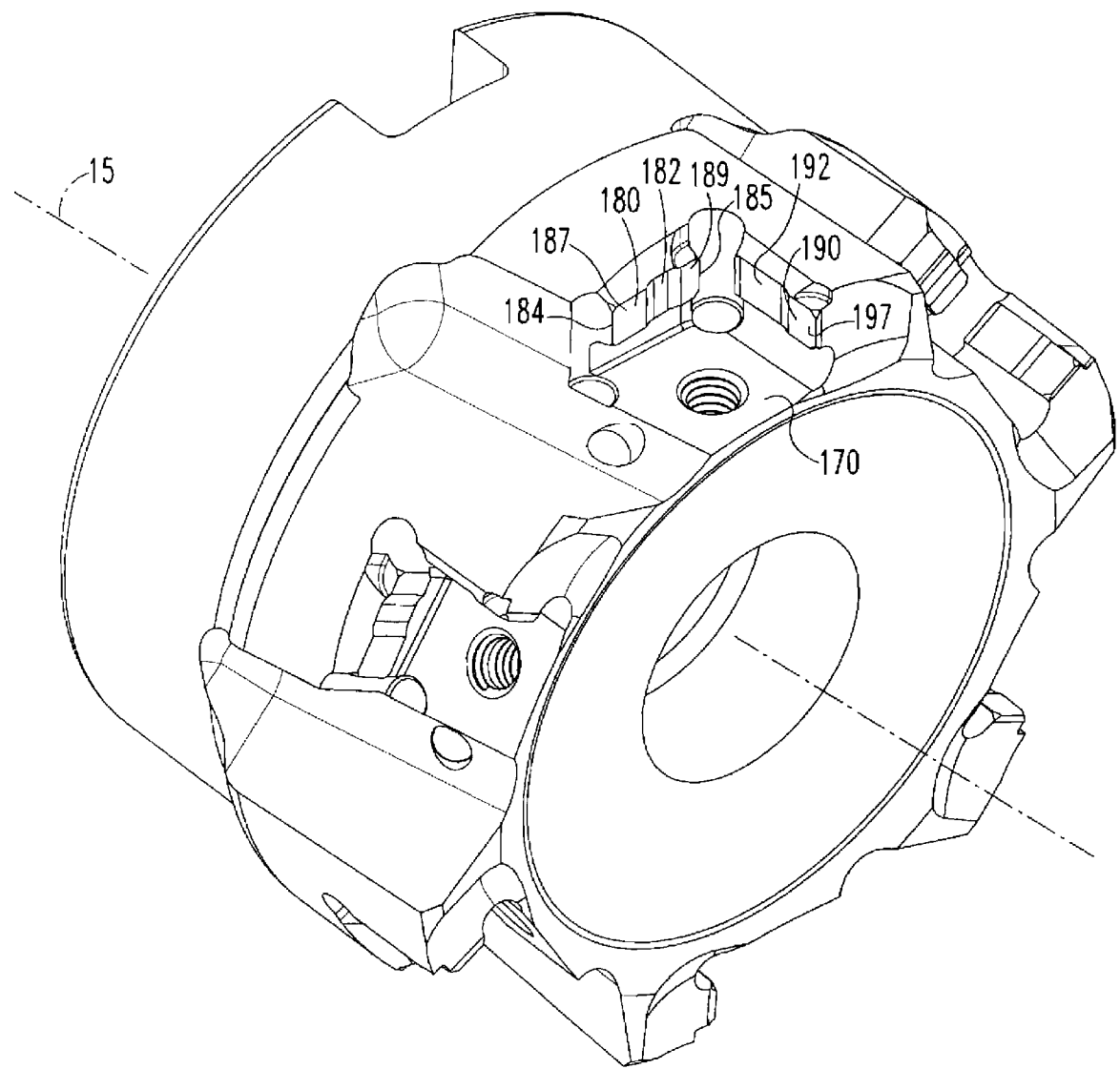
FIG. 8 is a milling cutter in accordance with another embodiment of the invention, whereby the surface of a seating pad within a pocket has a gap along its length.

Discussed so far, the mounting surfaces 75a, 75b, 75c, 75d, which are generally planar, have been designed to contact the respective support pads 78, 80 while the flat surface 64 (opposite side) has been designed to contact the floor 70 of the pocket 20. Due to manufacturing tolerances, full contact between the respective mounting surfaces 75a, 75b, 75c, 75d and the support pads 78, 80 is difficult to achieve. Therefore, another embodiment of the subject invention is directed to a design that will provide three-point contact between the support pads 78, 80 and the respective mounting surfaces 75a, 75b, 75c, 75d on the sides 47a, 47b, 47c, 47d of the insert 25. In particular and directing attention to FIG. 8, a support pad 180 perpendicular to the longitudinal axis 15, has an indentation 182 between the two ends 184, 185 of the support pad 180. The location of the indentation 182 may be centrally located between the two ends 184, 185. However, the primary purpose of the indentation 182 is to force contact at the support pad portions 187, 189 now defined by the indentation 182. By doing so, the associated mounting surface 75a, 75b, 75c, 75d (FIG. 3) of the cutting insert 25 will be supported at two predetermined locations on support pad 180. Additionally, the support pad 190 parallel to the longitudinal axis 15, has an indentation 192 that extends along a significant portion of the pad 190 beyond the single support pad portion 197 that remains elevated. In such a fashion, the support pad 180 and the support pad 190 provide a three-point contact to the mounting surfaces 75a, 75b, 75c, 75d of the cutting insert 25.

Figure 9:
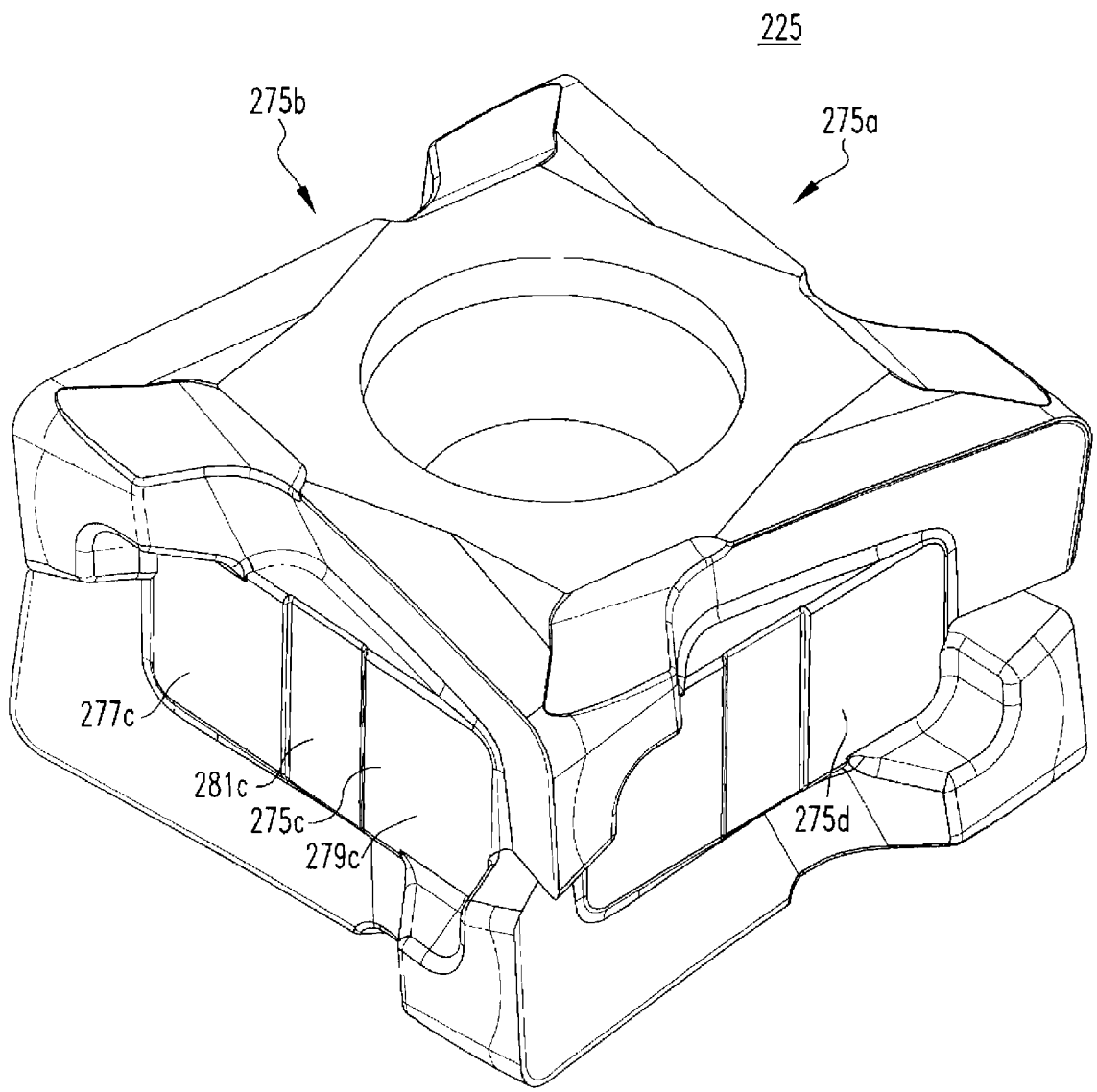
FIG. 9 is a perspective view of a cutting insert identical to that illustrated in FIG. 3, with the exception of split mounting surfaces.

FIG. 9 illustrates a different embodiment of the cutting insert 225, wherein the mounting surfaces 275a, 275b, 275c, 275d are split. In particular, with respect to mounting surface 275c, which is representative of all of the mounting surfaces 275a, 275b, 275c, 275d, there is a mounting surface portion 277c, another mounting surface portion 279c and an indentation 281c, therebetween. By providing an indentation 281c between the mounting surfaces 277c, 279c, the contact between the mounting surface 275c of the cutting insert 225 and the associated support pad 78, 80 (FIG. 3) of the pocket 20 will occur at the mounting surfaces 277c, 279c. Note that, in actuality, mounting surfaces 275a and 275b would contact support pads 78, 80, however, mounting surface 275c is discussed because it is visible. This minimizes the likelihood of uneven surface contact between the cutting insert 225 and the pocket 20 that may cause the insert 225 to rock within the pocket 20.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A toolholder for use in a metalworking operation, wherein the toolholder is adapted to hold an on-edge cutting insert with a depth and having first and second opposing segments about a central plane and with a central axis therethrough, wherein each segment has at least three sides and associated corners defining end cutting edges and, wherein each segment is radially offset relative to the other, wherein the toolholder comprises:
   a) a body extending along a longitudinal axis and having a first end;
   b) a pocket extending into the first end, wherein the pocket has at least two sides and the general shape and depth of the cutting insert intended to be held therein and, wherein the at least two sides intersect to define a pocket corner;
   c) a primary deep relief area located within the pocket corner and associated with a segment corner of the first segment and, wherein the primary deep relief area extends substantially to the depth of the cutting insert intended to be held within the pocket;
   d) a primary shallow relief area located within the same pocket corner and associated with a segment corner of the second segment and, wherein the primary shallow relief area is adapted to accommodate only the segment corner of the second segment and, wherein the primary shallow relief area extends only to the depth of the second segment; and
   e) supports pads extending from each of the at least two sides of the pocket defining a third segment between the first and second segments.

2. The toolholder in accordance with claim 1, each support pad extends along the length and protrudes from a side to define recesses adjacent to the pads for providing clearance to the cutting insert segments.

3. The toolholder in accordance with claim 1, wherein the depth of the primary shallow relief area extends to the support pad.

4. The toolholder in accordance with claim 1, wherein the primary shallow relief area is shaped to accommodate, in conjunction with the primary deep relief area, the second segment corner.

5. The toolholder in accordance with claim 1, wherein the primary shallow relief area overlaps the support pad over approximately 10-20 percent of the length of the support pad.

6. The toolholder in accordance with claim 5, wherein the secondary shallow relief area overlaps the support pad over approximately 15 percent of the length of the support pad.

7. The toolholder in accordance with claim 1, wherein the length of the support pad extends beyond the primary shallow relief area to the primary deep relief area.

8. The toolholder in accordance with claim 1, wherein the primary deep relief area is a generally cylindrical bore extending into the toolholder body.

9. The toolholder in accordance with claim 1, wherein the first and second segments are radially offset with respect to the third segment by an angle of between 1-4 degrees 10. The toolholder in accordance with claim 9, wherein the first and second segments are radially offset with respect to the third segment by an angle of between 2.5 degrees.

11. The toolholder in accordance with claim 1, wherein the pocket has two walls to accommodate a cutting insert having four sides.

12. The toolholder in accordance with claim 1, further including a secondary deep relief area along the support pad opposite the primary shallow relief area, wherein the secondary deep relief area extends substantially the entire depth of a cutting insert intended to be held within the pocket.

13. The toolholder in accordance with claim 12, further including a secondary shallow relief area along the support pad opposite the end of the primary deep relief area, wherein the secondary shallow relief area extends only to the depth of the second segment.

14. The toolholder in accordance with claim 13, wherein the secondary shallow relief area overlaps the support pad over approximately 10-20 percent of the length of the support pad.

15. The toolholder in accordance with claim 14, wherein the secondary shallow relief area overlaps the support pad over approximately 15 percent of the length of the support pad.

16. The toolholder in accordance with claim 1, wherein the support pad perpendicular to the longitudinal axis has an indentation between the two ends, such that the two ends provide support to the cutting insert.

17. The toolholder in accordance with claim 16, wherein a support pad perpendicular to the longitudinal axis has an indentation centrally located between the two ends.

18. The toolholder in accordance with claim 17, wherein a support pad parallel to the longitudinal axis has an indentation at the end closest to the pocket corner, thereby providing a three point contact to a cutting insert secured within the pocket.

19. The toolholder in accordance with claim 1, further including a threaded bore extending within the pocket floor to receive a mounting screw for holding the cutting insert within the pocket.

20. The toolholder in accordance with claim 2, wherein the toolholder is a milling cutter.

21. A toolholder for use in a metalworking operation, wherein the toolholder comprises:
  a) a body having a first end, wherein the body extends along a longitudinal axis;
  b) a pocket extending into the first end, wherein the pocket has the general shape and depth of an on-edge cutting insert intended to be held therein and, wherein the pocket has a pocket floor and at least a first interior wall and a second interior wall extending upwardly from the pocket floor;
  c) wherein the first and second interior walls intersect to form a corner region and, wherein the corner region has a dual relief area extending into the depth of the pocket to provide relief for a corner of a cutting insert mounted therein and having two radially shifted cutting edges;
  d) wherein the dual relief area has a first relief area that extends substantially the entire depth of the insert and a second relief area adjacent to the first relief area that extends to a partial depth of the insert; and
  e) further wherein said first and second interior walls also define first and second sides and, wherein the sides define support pads adapted to engage matching mounting surfaces on the cutting insert.

22. The toolholder in accordance with claim 2, wherein the toolholder is a milling cutter.

23. A toolholder assembly for use in a metalworking operation, wherein the assembly comprises:
  a) an on-edge cutting insert with a depth and having first and second opposing segments about a central plane and with a central axis therethrough, wherein each segment has at least three sides and associated corners defining cutting edges and, wherein each segment is radially offset relative to the other;
  b) a body extending along a longitudinal axis and having a first end;
  c) a pocket extending into the first end, wherein the pocket has at least two sides and the general shape and depth of the cutting insert intended to be held therein and, wherein the at least two sides intersect to define a pocket corner;
  d) a primary deep relief area located within the pocket corner and associated with a segment corner of the first segment and, wherein the primary deep relief area extends substantially to the depth of the cutting insert intended to be held within the pocket;
  e) a primary shallow relief area located within the same pocket corner and associated with a segment corner of the second segment and, wherein the second relief area is adapted to accommodate only the segment corner of the second segment and, wherein the second relief area extends only to the depth of the second segment; and
  f) supports pads extending from each of the at least two sides of the pocket defining a third segment between the first and second segments.

24. The toolholder assembly in accordance with claim 23, wherein the toolholder support pads have indentations to provide contact with a cutting insert at known locations.

25. The toolholder assembly in accordance with claim 23, wherein the cutting insert mounting surfaces have indentations to provide contact with the pocket of the toolholder at known location.

* * * * *